United States Patent [19]

Linn et al.

[15] 3,704,351

[45] Nov. 28, 1972

[54] TIMER WITH SANDWICHED INTERNAL ESCAPEMENT MECHANISM DISPOSED BETWEEN TWO PROGRAMMING MEANS

[72] Inventors: Wallace L. Linn; Elmo W. Voland, both of Indianapolis, Ind.

[73] Assignee: P. R. Mallory & Co., Inc., Indianapolis, Ind.

[22] Filed: May 28, 1971

[21] Appl. No.: 148,224

Related U.S. Application Data

[63] Continuation of Ser. No. 821,833, May 5, 1969, abandoned.

[52] U.S. Cl. .............................. 200/38 R, 74/568 T
[51] Int. Cl. ........................ H01h 7/10, H01h 43/10
[58] Field of Search ....200/38, 14, 153 LB; 74/568 T

[56] References Cited

UNITED STATES PATENTS 2,811,594  10/1957  Papouschek ................ 200/14
3,053,947  9/1962   Bowman et al. .......... 74/568 T
3,319,019  5/1967   Jullien-Davin ........... 200/38 R Primary Examiner—J. R. Scott
Attorney—Robert F. Meyer

[57] ABSTRACT

A timer has first and second cam programming means rotatably driven about a common axis at different speeds with one of the cam programming means being driven in response to the rotation of the other cam programming means, the two cam programming means being coupled together by an escapement means sandwiched between the two cam programming means.

14 Claims, 4 Drawing Figures

INVENTORS
WALLACE L. LINN
ELMO W. VOLAND
BY Robert F Meyer
ATTORNEY

INVENTORS
WALLACE L. LINN
ELMO W. VOLAND
BY Robert F Meyer
ATTORNEY

TIMER WITH SANDWICHED INTERNAL ESCAPEMENT MECHANISM DISPOSED BETWEEN TWO PROGRAMMING MEANS

This application is a continuation of application, Ser. No. 821,833 filed May 5, 1969, now abandoned.

This invention relates to a timer; and more particularly, to a timer wherein individual cam programming means are rotated at different speeds with an escapement coupling the cam programming means together.

In domestic appliances, such as washer and dryers, timing mechanisms are used to sequentially control the various operational functions of the appliance. As such appliances become more complicated, due to the different cycling operations needed to be performed, the timing mechanisms also become more complicated and as a result more bulky and expensive to produce. For example, in an appliance such as a washer, a rinsing cycle may be needed during or between many stages of other operations of the appliance. The timer therefore may require separate cam programming means with one of the cam programming means being driven at a constant speed with another set of programming means being intermittently indexed to be driven at predetermined times.

In timers such as these, an escapement means is sometimes used to intermittently index one of the cam programming means. Such escapement means are, by and large, complicated with many moving parts which thus adds to the bulkiness and the expense of the timer.

The present invention is concerned with a timer and has as one of its objects the provision of a timer utilizing an internal escapement.

Another object of the invention is to provide such a timer which is simple, neat, compact and economical to produce.

Another object of the invention is to provide such a timer wherein there are separate cam programming means rotatably driven about a common axis with one of the cam programming means being driven at a constant speed and the other being driven intermittently.

Still another object of the invention is to provide such a timer wherein there are two cam programming means carried by a common shaft with an escapement means sandwiched between the two.

Yet another object of the invention is to provide such a timer wherein the escapement means provides a means for driving one of the cam programming means in response to the rotation of the other cam programming means.

Still a further object of the invention is to provide such a timer having an escapement which includes a cam means coupled to one of the cam programming means, and a spring biased actuator means adapted to engage a ratchet means coupled to another cam programming means.

Another object of the invention is to provide a timer having an escapement wherein the actuator means includes a plate pivotally coupled on a mounting means for the timer with a cam follower means extending from the plate engaging cam means carried by one of the cam programming means.

Still another object of the invention is to provide a timer having an escapement wherein the actuator means of the escapement is spring biased.

Another object of the invention is to provide a timer having an escapement wherein pawl means engages a ratchet means in response to the movement of the actuator means.

Still another object of the invention is to provide a timer having an escapement wherein the pawl means of the escapement engages internal ratchet teeth coupled to one of the cam programming means.

Yet another object of the invention is to provide a timer having an escapement means wherein a pawl means of the escapement means slidably engages an aperture formed in the actuator means of the escapement.

These and other objects and the nature thereof will become apparent from the following description taken in conjunction with the accompanying drawings wherein like reference numbers describe elements of a similar function.

Generally speaking, the objects of the invention are accomplished by providing a timer wherein first and second cam programming means are rotatably driven about a common axis at different speeds and wherein one of the cam programming means is driven in response to the rotation of the other cam programming means, and wherein an escapement means is sandwiched between the two cam programming means.

Figure 1:
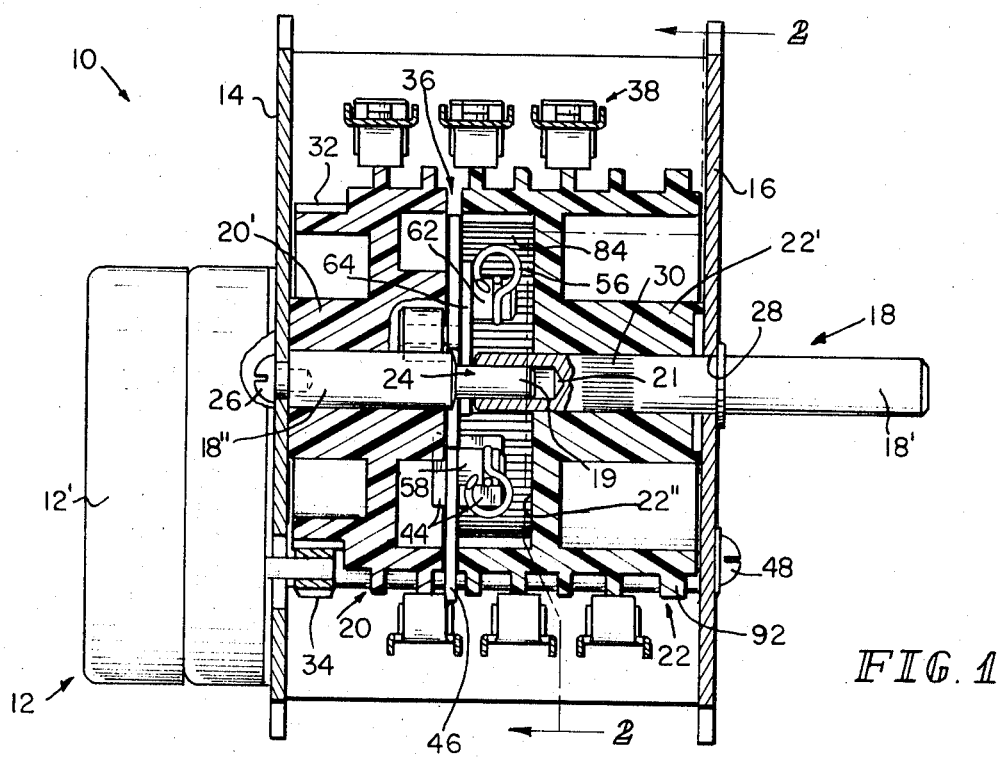
FIG. 1 is a cross section of the timer employing the principles of the invention.
Figure 3:
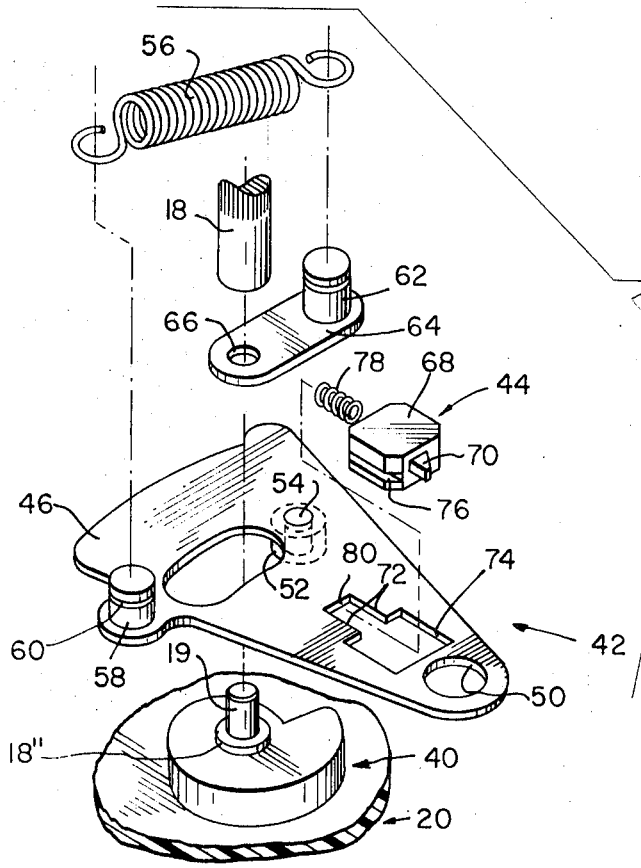
FIG. 3 is an exploded view of the escapement of the timer.

Referring now to the drawing, and particularly FIGS. 1 and 3, there is shown a timer 10 embodying the principles of the invention. The timer 10, except for the drive means 12, is carried within mounting plates 14 and 16. Drive means 12 includes a motor 12', such as a synchronous motor, and a cooperating speed reducing means such as a gear train. A shaft means 18 carries two cam programming means 20 and 22 which are rotatably driven at separate speeds about the common axis of the shaft means. Each of the cam programming means is carried by the shaft means 18 by two separate bearing surfaces. More specifically, the shaft means 18 is segmented into sections 18' and 18", the segments being journalled together through journal means 24 which as shown includes a shaft extension 19 adapted to mate bore 21 in segment 18'. Segment 18" is fixedly held to plate 14 by some suitable means such as screw 26, while segment 18' is rotatably journalled in plate 16 through aperture 28. Cam programming means 20 "floats" on segment 18" so as to be independently rotatable with respect to the segment. Cam programming means 22 is coupled to segment 18' through knurl 30 so as to rotate in accordance with the rotation of the segment. Cam means 20 is coupled to drive means 12 through gear means 32 and motor pinion 34 so as to be driven at a constant speed by the drive means. As will be more completely described hereinafter, cam programming means 22 is driven intermittently in response to the rotation of the cam programming means 20 through escapement means 36. Rotation of both of the cam programming means opens and closes a plurality of electrical switch means 38 to selectively cycle the appliance in which the timer is utilized according to a programmed sequence.

As shown, the escapement means is sandwiched between the two cam programming means. This arrangement provides for a very compact and neat timer. As will be apparent as the description proceeds, this sandwiching of the escapement means between the two programming means has been accomplished by providing an escapement having a minimum number of parts which are very discretely and precisely combined to form a neat, compact mechanism. In order to permit the escapement to be sandwiched between the two cam programming means without substantial increase in the size of the timer, the hub 22' includes a cup-shaped recessed portion 22''.

Figure 2:
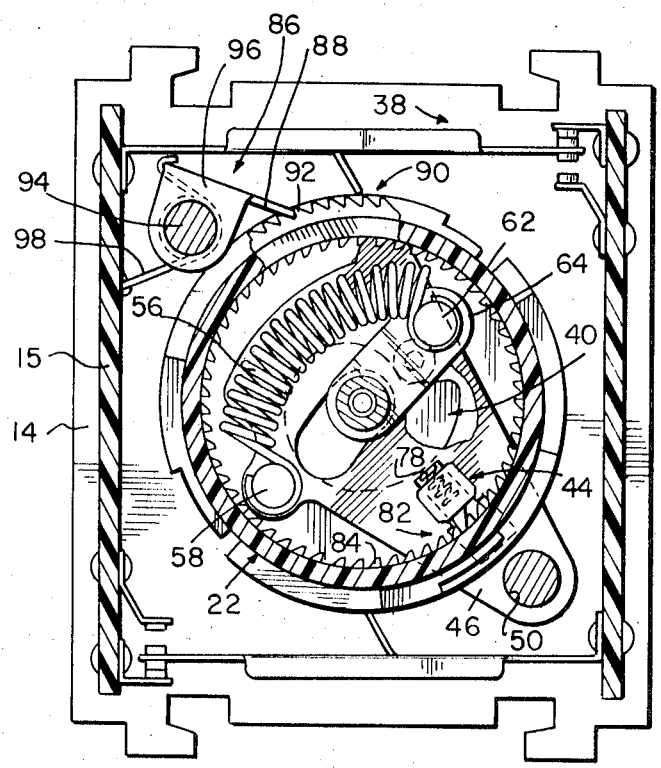
FIG. 2 is a view taken along the lines 2—2 of FIG. 1.

The escapement means of the present invention includes a cam means 40, a spring biased actuator means 42 and a pawl means 44. Cam means 40 is coupled to cam programming means 20 by a suitable means such that the cam means rotates in accordance with the rotation of the cam programming means. As shown, the cam means 40 is coupled to the cam programming means 20 by being formed as part of the hub 20' of the cam programming means. Actuator means 42 includes a plate 46 pivotally coupled to plate 16 through spacer post 48 by way of aperture 50. The actuator means 42 is responsive to cam means 40 through a cam follower means which includes roller 52. The roller is carried by a pin 54 that is connected to the plate 46. The actuator means is spring biased by a suitable spring such as coil spring 56 which is connected at one end to a post 58 through groove 60 formed in the post. The other end of the coil spring is connected to a post 62 which is carried by a bar 64, the bar 64 being disposed adjacent and above the plate 46 and being coupled to the shaft segment 18'' through aperture 66. Thus post 62 becomes the fixed, anchoring point of the spring. Coil spring 56 is preferably a constant force spring, such that the spring may be bowed or expanded at a constant rate. This saves wear and tear on the various elements of the escapement. Pawl means 44 includes a block 68 and a ratchet tooth 70 extending from the block. The block 68 slidably engages sides 72 of aperture 74 through guide slots 76. Pawl means 44 is spring biased through a suitable spring such as coil spring 78 which engages the end 80 of aperture 74 and is recessed in a bore (not shown) in the block 68. Referring to FIGS. 1 and 2, pawl means 44 engages a ratched means 82 which is coupled to cam programming means 22. Ratchet means 82 includes internal gear or ratchet teeth 84 formed in hub 22' of cam programming means 22.

Figure 4:
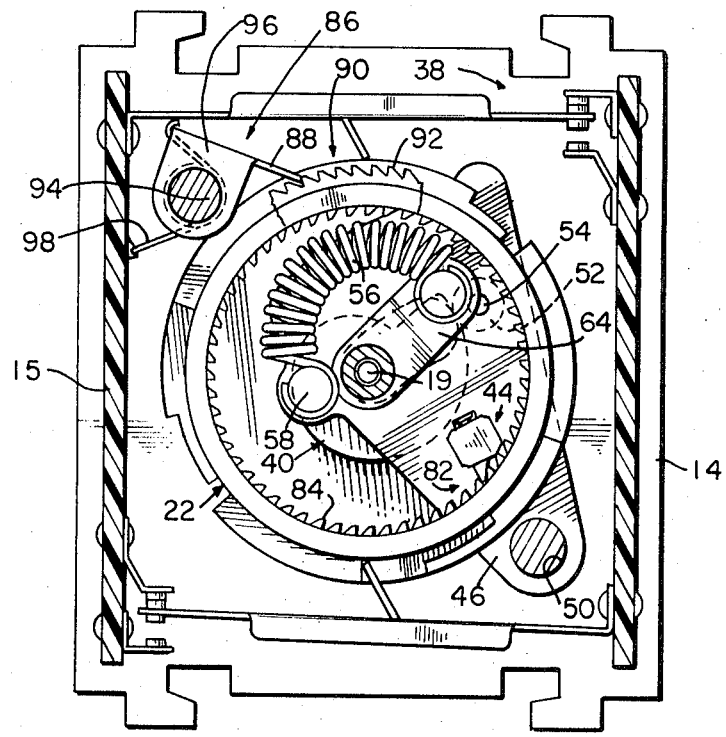
FIG. 4 is a view similar to FIG. 2 showing another position of the escapement of the timer.

Referring now to FIGS. 2 and 4, the operation of the timer can be described. Drive means 12 drives cam programming means 20 at a constant rate of speed. As cam programming means 20 rotates, cam means 40 rotates in accordance with such rotation. Cam follower means or roller 52 of actuator means 42 follows the contour of the cam and when the roller reaches the low point of the contour (FIG. 2), spring 56 will be released from its coiled position, forcing actuator means to pivot counterclockwise so as to force pawl means 44 into engagement with internal ratchet teeth 84 of the ratchet means 82. This advances cam programming means 22 clockwise one step. As the roller 52 follows the rise contour of the cam means 40, actuator means 42 pivots clockwise, compressing the spring 56 (FIG. 4). Pawl means 44 disengages from ratchet teeth 84, and becomes positioned for engagement with the next succeeding tooth of the ratchet teeth to complete the cycle.

There is also provided a no-back up means 86 to prevent the cam programming means 22 from back up as it is intermittently driven forward. No-back up means 86 includes a pawl means adapted to engage ratchet means 90, which includes teeth 92 formed on the outer periphery of hub 22' of cam programming means 22. Pawl 88 is pivotally mounted on post 94 through an aperture in frame 96. The pawl is spring biased through a suitable spring such as coil spring 98 which is connected to end plate 15 and the frame 96. As the cam programming means is indexed forward in a clockwise direction, pawl 88 engages each succeeding tooth to thereby prevent back-up of the cam programming means.

Thus there is described a timer which includes two separate cam programming means rotatably mounted on a common axis, each being independently rotatable with an escapement coupling the two cam programming means, the escapement being sandwiched between the two to give a neat and compact package.

We claim:
1. A timer comprising:
   a. mounting means,
   b. drive means carried by said mounting means,
   c. shaft means carried by said mounting means, said shaft means including first and second segments, said first segment fixedly carried by said mounting means, said second segment rotatably journalled in said mounting means, and journal means coupling said segments together,
   d. a first cam programming means carried by said first segment, a second cam programming means carried by said second segment, said first and second cam programming means including hub means each of said hub means having recessed portions facing each other, one of said recessed portions being cup-shaped and surrounding said shaft means, both of said recessed portions adapted to receive at least a portion of an escapement means sandwiched between said first and second cam programming means, said escapement means causing intermittent rotation of said second cam programming means in response to the rotation of said first cam programming means.

2. In a timer wherein first and second cam programming means are rotatably driven about a shaft means and wherein one of said cam programming means is intermittently driven in response to the rotation of the other of said cam programming means, a spring operated escapement means including a pivotally mounted actuator plate pivoting between said first and second cam programming means and being limited in its travel by a spring disposed between said first and second cam programming means, an end of said spring connected to a free end of said actuator plate, the other end connected to said shaft means, rotation of one of said cam programming means driving said spring operated escapement means to cause said intermittent driving of the other cam programming means.

3. In a timer according to claim 2 wherein said spring is connected to an end of a bar connected to said shaft means.

4. In a timer according to claim 3, said spring escapement further including a roller extending from said actuator plate and engaging a cam means coupled to one of said cam programming means so as to selectively pivot said actuator plate, and pawl means coupled to said actuator plate, said pawl means adapted to engage ratchet means coupled to the other of said cam programming means.

5. In a timer according to claim 4, wherein said pawl means is spring biased and said actuator plate contains an aperture receiving said pawl means, said pawl means slidably engaging the sides of said aperture.

6. In a timer according to claim 2 wherein each of said first and second cam programming means includes a hub means, each of said hub means having a recessed portion facing each other and adapted to receive portions of said spring operated escapement means.

7. In a timer according to claim 6 wherein one of said recessed portions is cup-shaped and receives said spring.

8. In a timer according to claim 7 wherein said spring operated escapement further includes a pawl coupled to said actuator plate, said pawl engaging ratchet teeth provided in said cup-shaped recess portion.

9. In a timer according to claim 2, wherein said first and second cam programming means are carried by said shaft means through separate bearing surfaces.

10. In a timer according to claim 9, wherein said shaft means includes two segments, one of said first and second cam programming means carried by one of said segments, the other of said cam programming means carried by the other of said segments.

11. In a timer according to claim 10, wherein said shaft means further includes journal means coupling said segments together.

12. In a timer according to claim 2, wherein said escapement means further includes cam means coupled to one of said first and second cam programming means, said actuator plate responsive to said cam means, and pawl means coupled to said actuator means, said pawl means adapted to engage ratchet means coupled to the other of said first and second cam programming means.

13. In a timer according to claim 2, wherein said spring is a coil spring.

14. In a timer according to claim 13, wherein said coil spring is a constant force spring.

* * * * *